July 17, 1928.
W. H. COLES
1,677,228
IRRIGATING APPARATUS
Filed Oct. 26, 1921
9 Sheets-Sheet 3
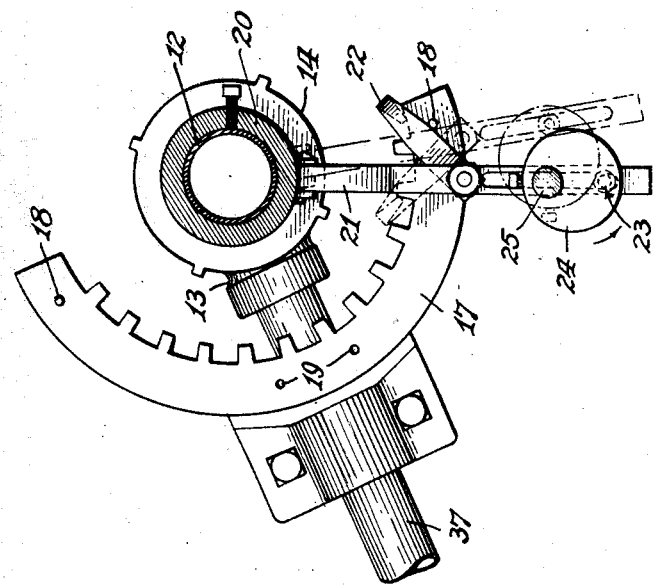
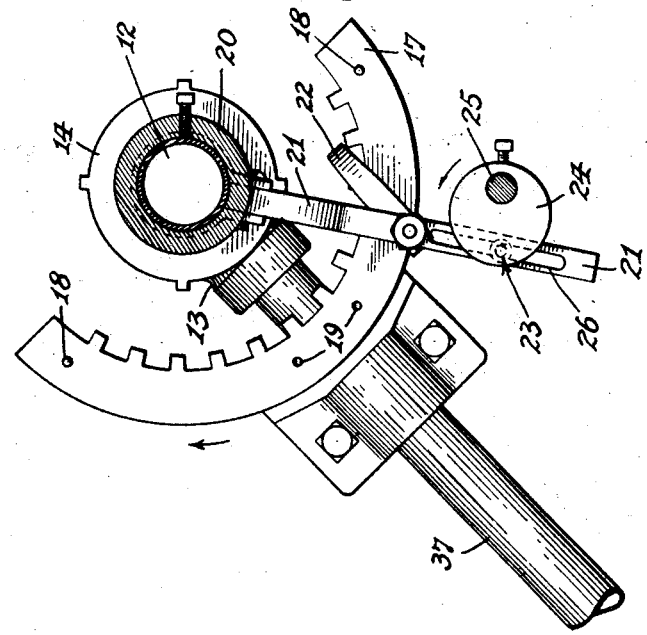
Inventor
Walter H Coles
By his Attorney July 17, 1928.

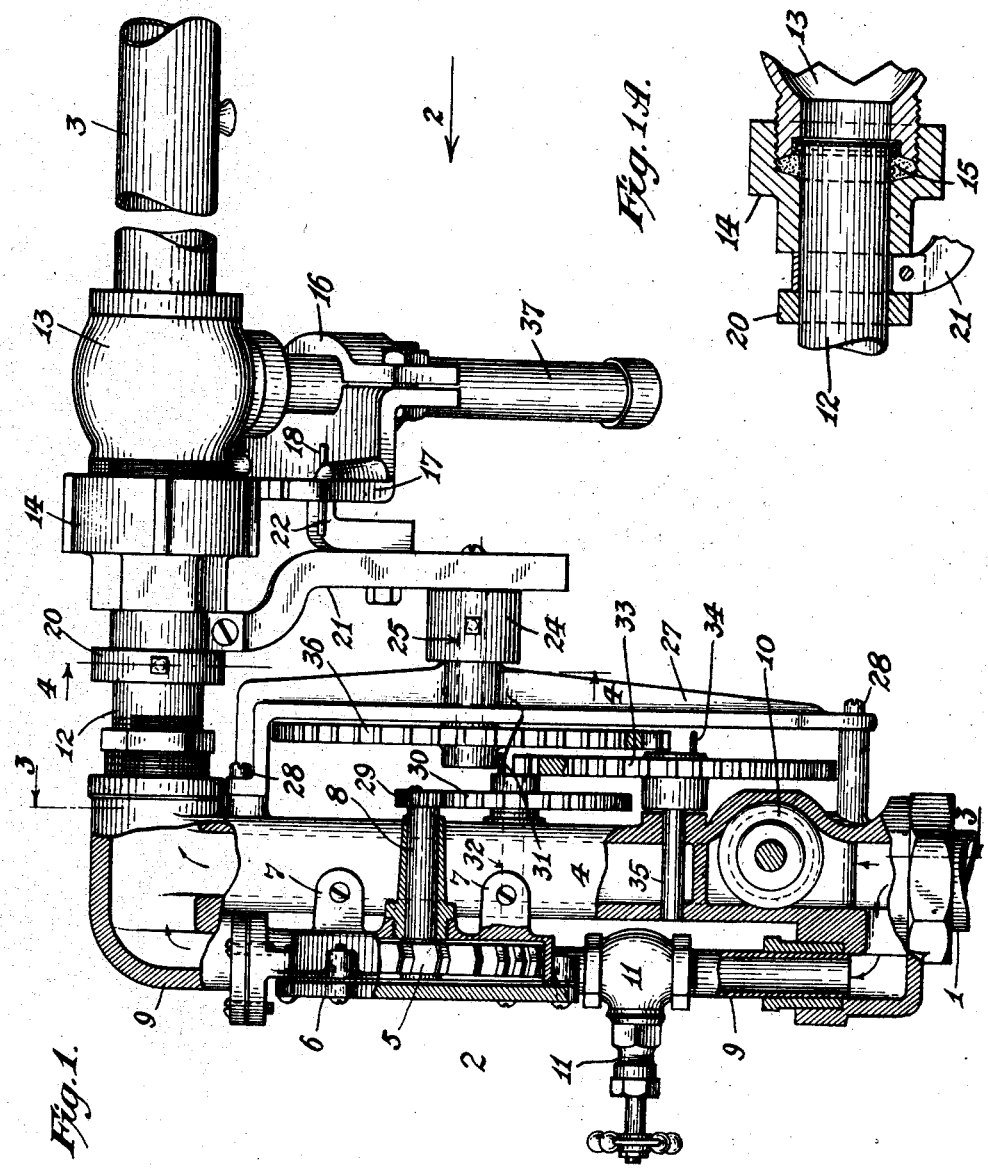

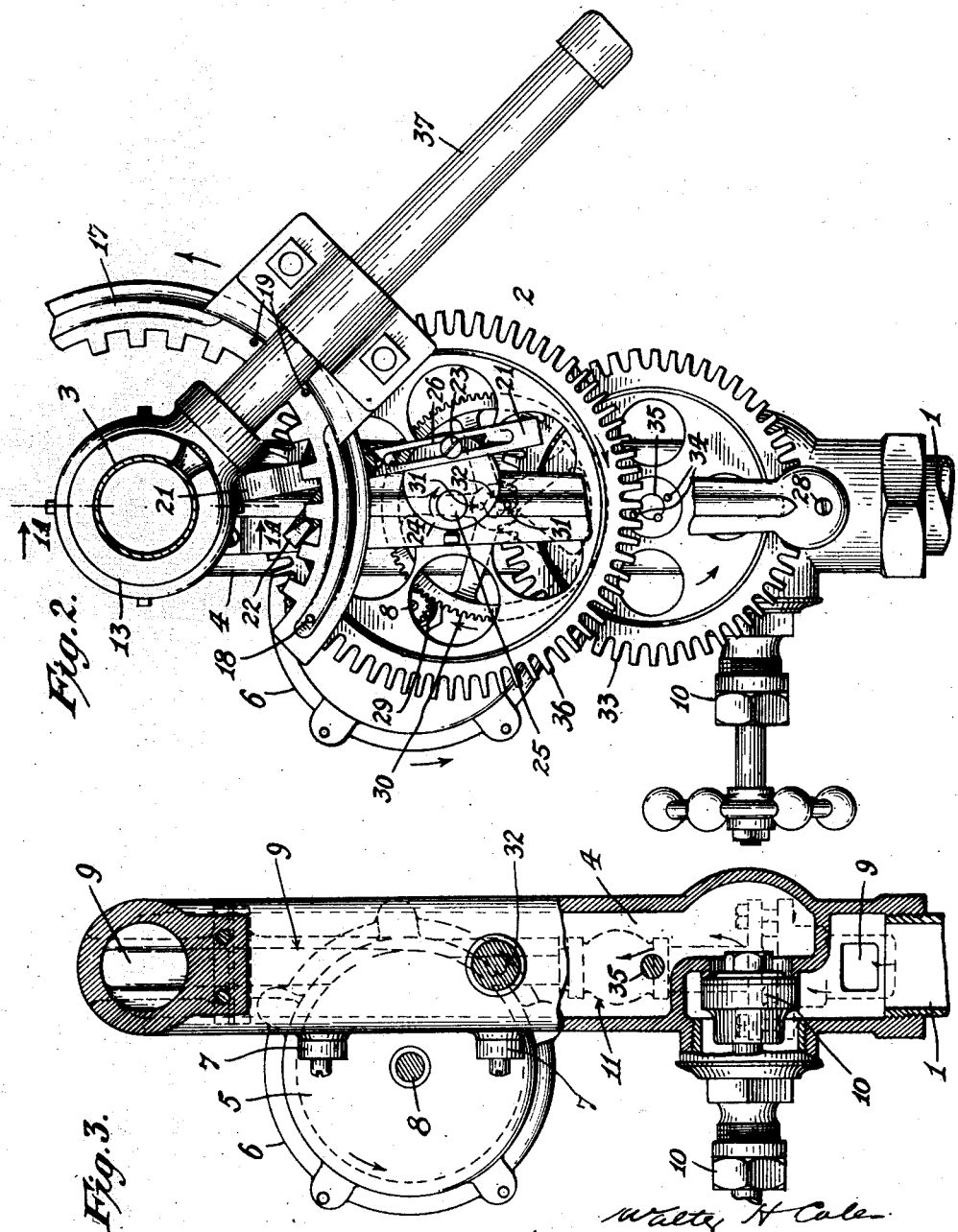

W. H. COLES 1,677,228

IRRIGATING APPARATUS

Filed Oct. 26, 1921

Inventor
Walter H Coles
By his Attorney

July 17, 1928.  W. H. COLES  1,677,228
IRRIGATING APPARATUS
Filed Oct. 26, 1921   9 Sheets-Sheet 9

Inventor
Walter H Coles
By his Attorney

Patented July 17, 1928.

1,677,228

UNITED STATES PATENT OFFICE.

WALTER H. COLES, OF TROY, OHIO.

IRRIGATING APPARATUS.

Application filed October 26, 1921. Serial No. 510,634.

This invention relates generally to irrigating apparatus and has as its main object a simple construction in which the water used for irrigating purposes is likewise used for the slow turning of one or more irrigating pipes and for automatically reversing the turning movement of said pipe, the construction also embodying simple means for varying the rate of flow of irrigating water and the speed of oscillation of the pipe.

Other objects and features of construction will appear as the specification proceeds.

In the accompanying drawings, the invention is disclosed in a concrete and preferred form in which Fig. 1 is a side elevation, partly broken away and in section of a device embodying the invention.

Fig. 1ª is a sectional detail view on the plane of line 1ª—1ª of Fig. 2.

Fig. 2 is a view looking in the direction of arrow 2 of Fig. 1.

Fig. 3 is a vertical sectional view approximately on the plane of the irregular line 3—3 of Fig. 1.

Fig. 4 is a detail sectional view on the plane of line 4—4 of Fig. 1 showing the actuating means for oscillating the pipe, the parts being shown in the position they occupy during the stroke in one direction.

Fig. 5 is a view, similar to Fig. 4, showing the parts in the position they occupy at the moment of reversal at the end of the stroke in one direction.

Figure 6:
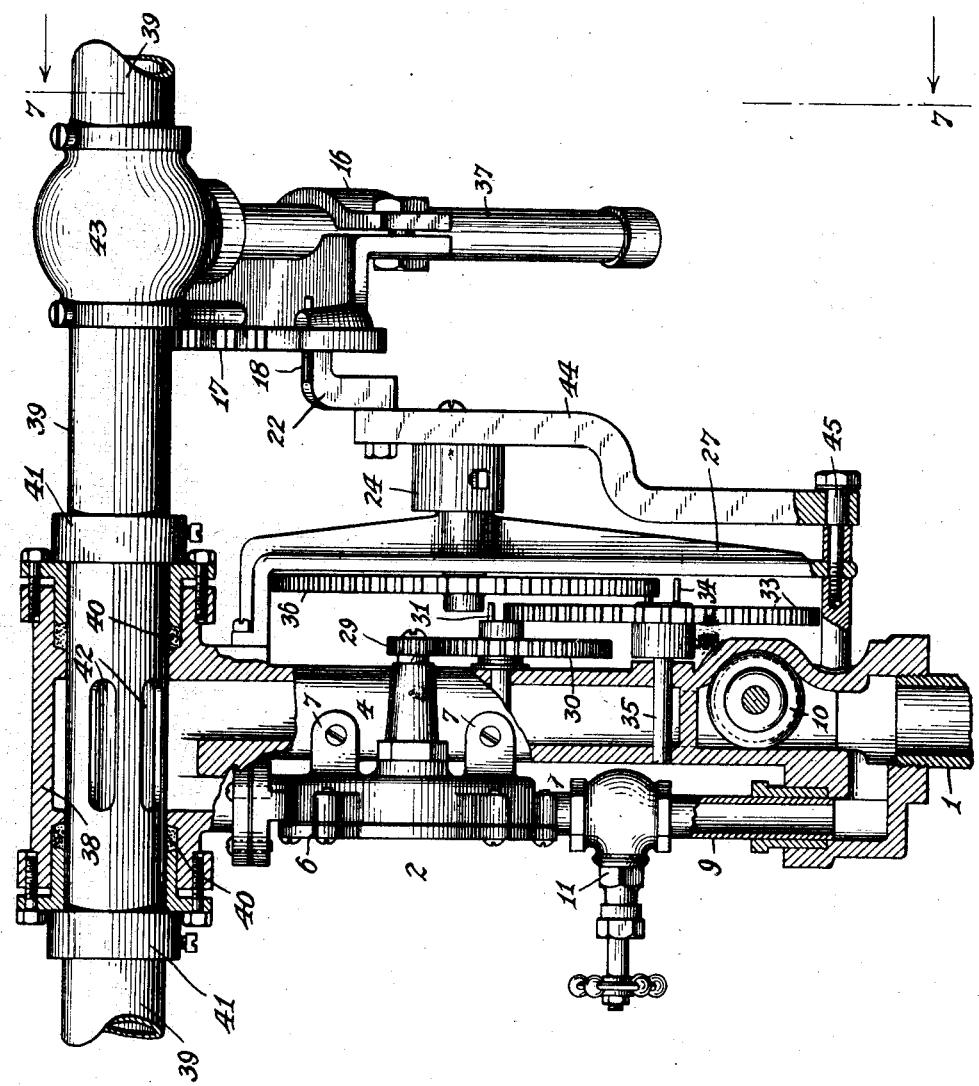
Fig. 6 is a view similar to Fig. 1, but showing a modified form of the invention.

Connected with an upright pipe 1 is a power unit 2 through which the irrigating water passes to the horizontal oscillating sprinkler pipe 3.

Said power unit comprises essentially a main duct 4 on one side of which, preferably the outer side, is arranged a rotary water motor 5, the casing 6 of which is bolted to the main duct at 7, preferably in such manner that shaft 8 of the water motor passes at one side of the main duct, the water motor being located in a branch duct 9, connected with the main duct at the upper and lower end thereof, the two ducts forming a head at the upper end of the structure. 10 is a valve interposed in the main duct and 11 is a valve interposed in the branch duct.

12 is a stationary pipe extending in a horizontal direction from the power unit and forming a continuation of the ducts thereof and is in constant communication with the sprinkler pipe 3, there being a joint (Fig. 1ª) formed by means of the globe member 13, into which the end of pipe 3 is threaded, and collar 14 threaded on said globe member and rotatably mounted on pipe 12. It will be noted that the end of pipe 12 extends into the globe member and that a packing 15 is employed to form a tight joint. Carried by sprinkler pipe 3 and preferably mounted on globe member 13 by means of bracket 16 is a gear sector 17. This sector has a single set of internal teeth facing both ways, and carries two pins 18 that may be positioned, as shown, near the extremity of said sector or at some intermediate point indicated at 19, depending upon the extent of oscillation of pipe 3 desired.

Mounted loosely on pipe 12 and intermediate collars 14 and 20 is a swinging arm 21 provided with a pivotally supported pawl 22 engaging sector 17. Suitable means for rocking said arm are provided, here taking the form of a crank pin 23 carried by crank member 24 on shaft 25, the crank pin engaging in the elongated slot 26 of arm 21. Shaft 25 is suitably supported as by means of bracket 27 bolted at 28 to the main duct on that side which is opposite to the one on which the water motor is located and its axis is parallel to the axis of said water motor. Suitable reduction transmission means are interposed between shaft 25 and shaft 8 consisting here of a train of gears including pinion 29 on shaft 8, spur gear 30 and pins 31 on shaft 32 carried by the main duct, spur gear 33 and pins 34 carried by shaft 35 of the main duct and spur gear 36 on shaft 25. 37 is an extension forming a handle by which the oscillating pipe may be adjusted or set by hand.

It will be understood that rotation of the water motor causes, through the train of reduction gears mentioned, rotation of crank pin 23 and thereby oscillation of arm 21. Pawl 22 is thereby so actuated that, when moved in one direction (to the left in Fig. 4), it carries sector 17 with it; and, when actuated in the other direction (to the right in Fig. 4), said pawl, owing to its pivotal connection on arm 21, will ride over one tooth without turning the sector. In this manner pipe 3 will be turned, step by step, until pawl 22 strikes pin 18 (as in Fig. 5) when its position is reversed and the continued movement of crank pin 23 will then pull the sector back, step by step, in the opposite direction until the other pin 18 is reached. If it is desired to decrease the extent of the oscillation of pipe 3, pin 18 is inserted in another hole such as 19.

This invention is an improvement in the construction shown in Patent No. 1,112,271 and to prevent backward rotation of the sprinkler pipe, the same supporting means as is shown in Fig. 6 of that patent may be employed.

Usually the amount of water supplied to the sprinkling pipe and the speed of motor 5 will be regulated by adjusting valve 10, the speed of the motor being increased and the amount of the water supplied directly to sprinkler pipe 3 being decreased by partially closing valve 10 and, conversely, the speed of the motor being diminished and the amount of water supplied directly to the sprinkler pipe being increased by opening valve 10 more widely. Since, however, the water from the motor returns to the main circuit, the effective result will be a variation of motor speed, and hence oscillation of the sprinkler pipe without a variation of the amount of water. If it is desired to vary the motor speed to a great nicety, valve 11 may be actuated to vary the amount of water supplied to the motor.

Figure 7:
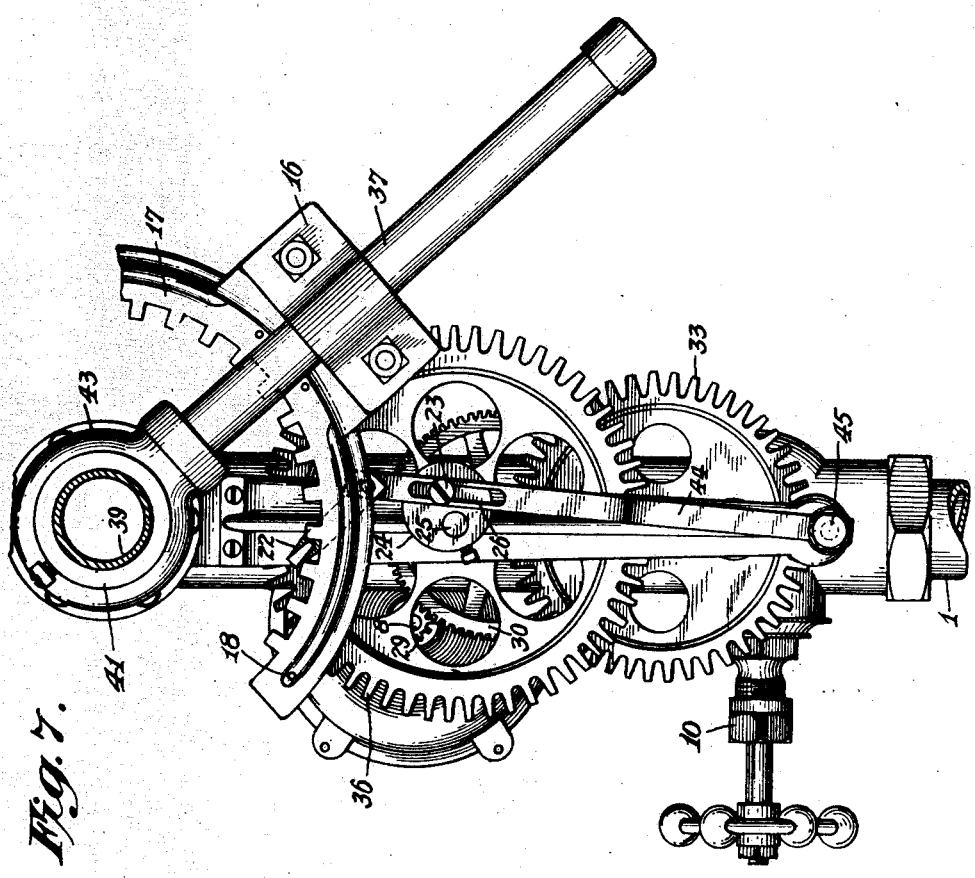
Fig. 7 is a sectional view on the plane of line 7—7 of Fig. 6.

In Figs. 6 and 7 is shown a modified construction in which the head 38 terminating the two ducts is of T formation and open at both sides. Oscillatory sprinkler pipe 39 extends clear through this head and has swivel connection therewith, there being a suitable packing as 40 at each end and collars 41 to prevent endwise displacement. Pipe 39 has openings 42 by means of which water flows from the ducts or head into the sprinkler lines. Globe member 43 is, in this instance, rigid on pipe 39 and is devoid of any swivel joint, serving merely as a support for extension or handle 37 and for gear sector 17. The effect of this construction is to produce two oscillatory sprinkler lines in axial alinement and movable in unison and controlled from a single handle.

A slight modification of the mounting of the oscillating arm that carries the pawl is also shown in these figures. As here shown, arm 44, instead of being hung on pipe 39 is pivotally supported at 45 on bracket 27. The gearing is otherwise exactly the same as in Figs. 1 to 5.

Figure 8:
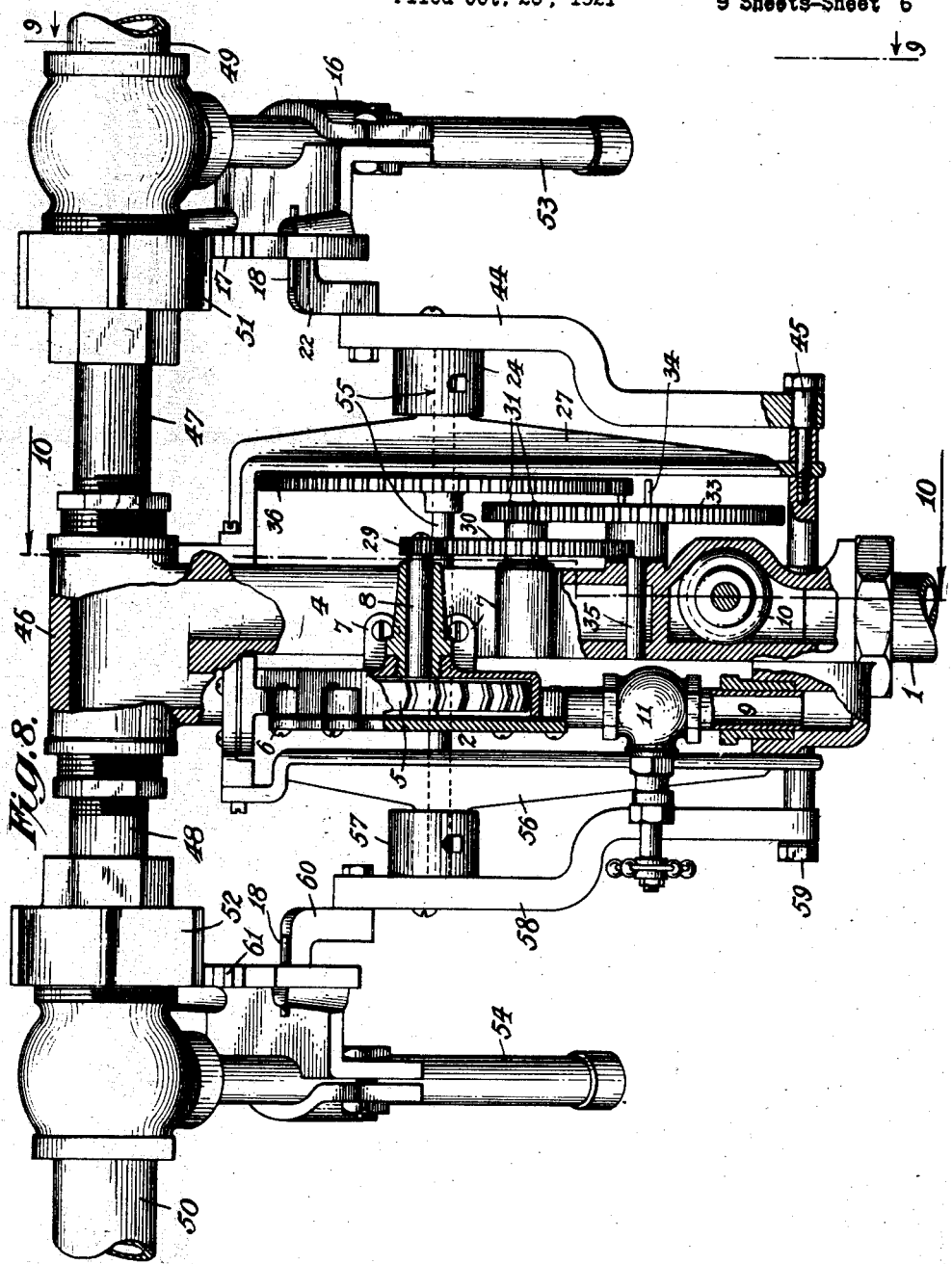
Fig. 8 is a view similar to Fig. 1, but showing a second modified form of the invention.
Figure 9:
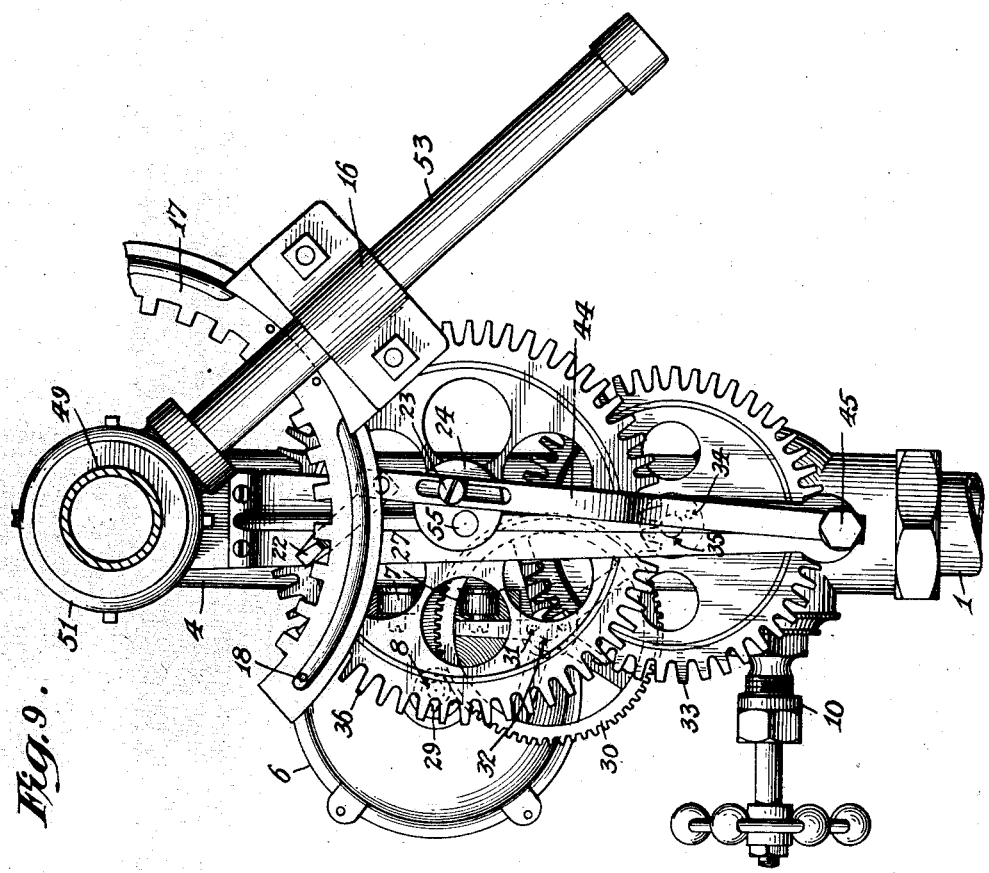
Fig. 9 is a sectional view on the plane of line 9—9 of Fig. 8.
Figure 10:
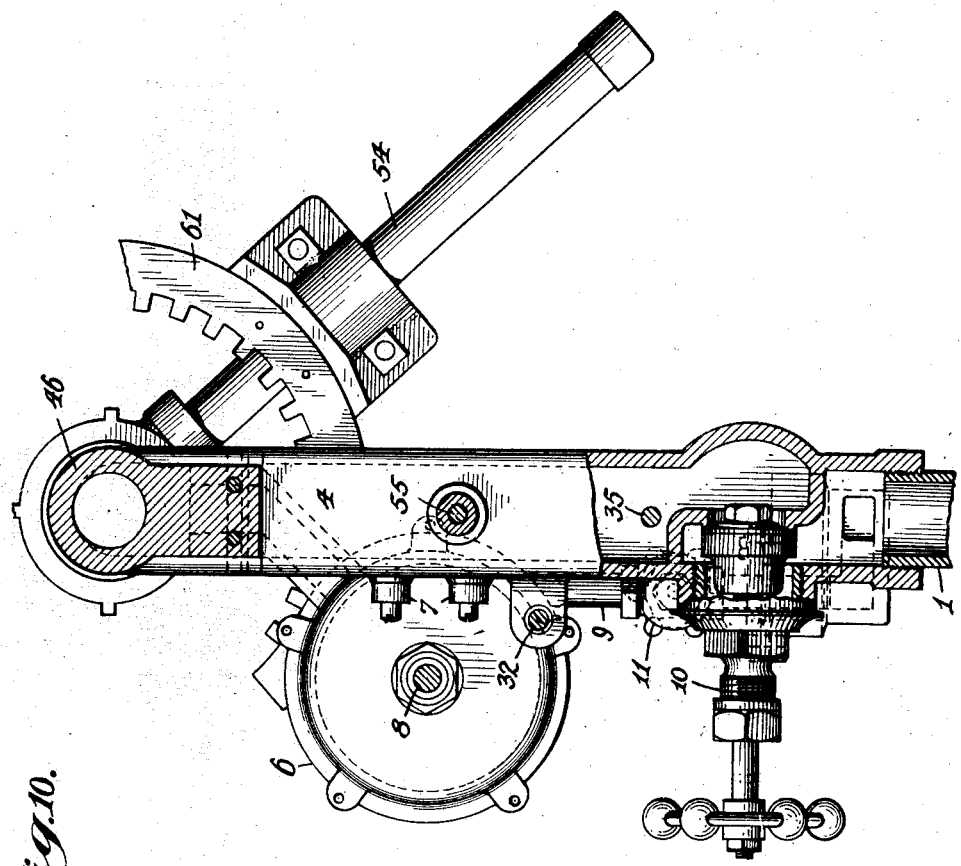
Fig. 10 is a sectional view on the plane of line 10—10 of Fig. 8.

In Figs. 8, 9 and 10 are shown a second modified form of the invention. In this construction the power unit terminates at its upper end in a head 46 open at both sides into which are screwed stationary pipes 47 and 48 and connected to each of these stationary pipes is an oscillatory sprinkler pipe 49 and 50; the connection being made by means of a swivel joint 51 or 52 similar to the member 14 in Fig. 1 and each provided with a separate operating handle 53 or 54. The gearing here is the same as in Fig. 1, except that the crank shaft 55 extends through the casing of the power unit at the other side thereof, where it is supported by a second bracket 56, bolted to the casing, and is provided at that end with a crank 57 engaging a slot in oscillatory arm 58 pivotally supported at 59 and pivotally supporting a reversible pawl 60 engaging a gear sector 61 carried by extension 54. By this means two independent sprinkler lines can be oscillated together or independently of each other from the same motor. If it is desired to silence one of the sprinkler lines, the crank or the pawl or some other part may be removed or valves that may be located in pipes 47 and 48 or 49 and 50 (but not shown) may be closed, or a valve may be closed and say a pawl removed or rendered inactive. Furthermore, by positioning pins 18 of one sprinkler line differently from those of the other, different arcs of oscillation of the two coaxial sprinkler lines may be produced.

Figure 11:
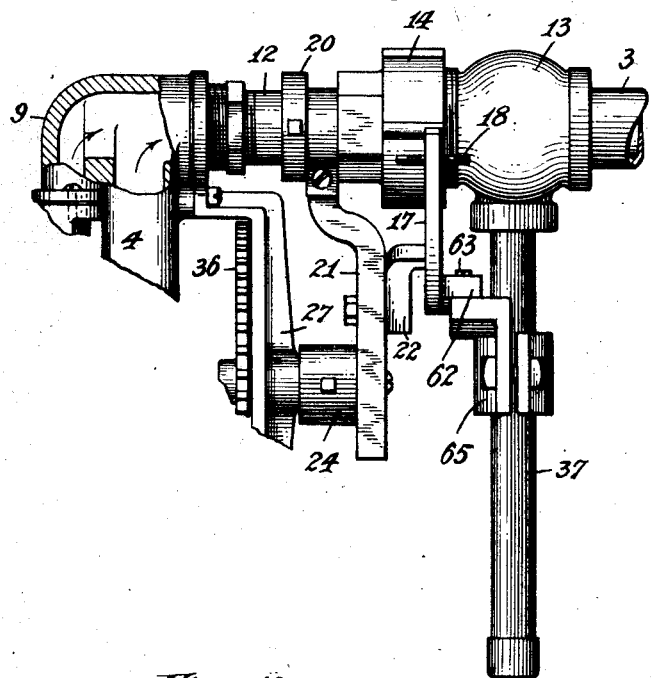
Fig. 11 is a view in elevation and partly in section of the upper right hand portion of Fig. 1, showing a still further modified form of the invention.
Figure 12:
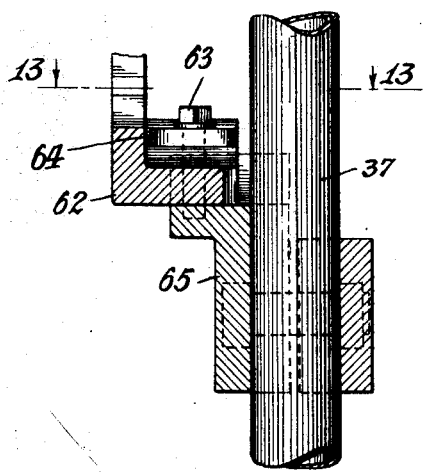
Fig. 12 is a vertical sectional view on the plane of line 12—12 of Fig. 13.
Figure 13:
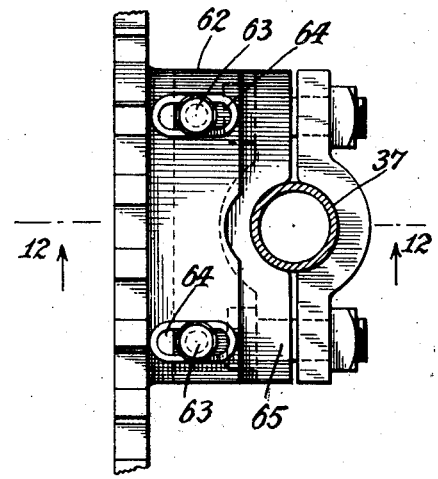
Fig. 13 is a horizontal sectional view on the plane of line 13—13 of Fig. 12.

Referring to Figs. 11, 12 and 13, sometimes difficulty is experienced in properly spacing pawl 22 with respect to sector 17 because of the difficulty to always screw pipe 12 into the power unit a predetermined distance. To overcome this difficulty gear sector 17 is carried by a bracket 62 which is adjustably mounted by reason of bolts 63 and slots 64 on member 65 forming a part of a clamp surrounding extension 37. In Fig. 11 oscillating arm 21 is shown mounted as in Fig. 1, but it will be understood that it may be mounted as in Figs. 6 or 8.

I claim:

1. An oscillatory pipe, an extension carried thereby, a clamp on said extension, an adjustable bracket on said clamp, a gear sector carried by said bracket, an oscillating arm, and a pawl pivoted on said arm to engage said sector.

2. An oscillatory sprinkler pipe, a gear sector having a single set of teeth facing both ways, a pivotally supported pawl to engage the gear sector to turn the pipe step by step, and means for automatically reversing the position of the pawl by throwing it over its pivotal center when the pipe reaches the end of its turning movement.

3. An oscillatory sprinkler pipe, a gear sector carried thereby, an oscillating arm, a pawl, to engage the sector, pivotally supported on the oscillating arm, and means for automatically reversing the position of the pawl by throwing it over its pivotal center when the pipe reaches the end of its turning movement.

4. Irrigation apparatus including: a main duct, an oscillatory sprinkler pipe connected to the main duct, a branch duct connected with the main duct and arranged exteriorly thereof, a rotary water motor arranged in said branch duct, the axis of rotation of said motor being parallel to the axis of the sprinkler pipe, a rotatable shaft also parallel to the sprinker pipe, reduction gearing between the motor and said shaft, and transmission means to oscillate the sprinkler pipe by the rotation of the shaft.

5. Irrigation apparatus including: a main duct, an oscillatory sprinkler pipe connected to the main duct, a branch duct connected with the main duct and arranged exteriorly thereof, a rotary water motor arranged in said branch duct, the axis of rotation of said motor being parallel to the axis of the sprinkler pipe, a rotatable shaft also parallel to the sprinkler pipe, reduction gearing between the motor and said shaft, a crank on said shaft, and connections to oscillate the sprinkler pipe from said crank.

Signed at Troy, in the county of Miami and State of Ohio, this 19 day of October, 1921.

WALTER H. COLES.